United States Patent [19]

Hotier et al.

[11] Patent Number: 5,114,590
[45] Date of Patent: May 19, 1992

[54] CONTINUOUS PROCESS AND DEVICE FOR THE CHROMATOGRAPHIC SEPARATION OF A MIXTURE OF AT LEAST THREE CONSTITUENTS INTO THREE PURIFIED EFFLUENTS BY MEANS OF A SINGLE SOLVENT AT TWO DIFFERENT TEMPERATURES AND/OR AT TWO DIFFERENT PRESSURES

[75] Inventors: Gérard Hotier, Rueil Malmaison; Jean-Michel Toussaint, Asnieres; Gabriel Terneuil, Grenoble; Daniel Lonchamp, La Demi Lune, all of France

[73] Assignee: Institut Francais du Petrole, Rueil Malmaison, France

[21] Appl. No.: 573,564

[22] Filed: Aug. 28, 1990

[30] Foreign Application Priority Data

Aug. 28, 1989 [FR] France .................. 89 11365

[51] Int. Cl.⁵ .................................................. B01D 15/08
[52] U.S. Cl. .................................. 219/659; 210/198.2; 127/46.1; 127/46.2
[58] Field of Search ............... 210/635, 656, 659, 672, 210/198.2; 208/310 R; 127/46.1, 46.2

[56] References Cited

U.S. PATENT DOCUMENTS

| | | | |
|---|---|---|---|
| 2,985,589 | 5/1961 | Broughton et al. | 210/34 |
| 3,696,107 | 10/1972 | Neuzil | 208/310 |
| 3,706,812 | 12/1972 | Derosset et al. | 260/674 SA |
| 3,761,533 | 9/1973 | Otani et al. | 208/310 |
| 4,029,717 | 6/1977 | Healy et al. | 208/310 |
| 4,031,156 | 6/1977 | Geissler et al. | 210/672 |
| 4,306,107 | 12/1981 | Broughton | 585/828 |
| 4,379,751 | 4/1983 | Yoritomi | 210/659 |
| 4,402,832 | 9/1983 | Gerhold | 210/659 |
| 4,498,991 | 2/1985 | Oroskar | 210/659 |
| 4,664,718 | 5/1987 | Chang | 127/46.2 |
| 4,724,081 | 2/1988 | Kawahara | 210/198.2 |
| 4,970,002 | 1/1990 | Ando | 210/659 |
| 4,990,259 | 2/1991 | Kearney | 210/659 |

FOREIGN PATENT DOCUMENTS 1488616 10/1977 United Kingdom ............ 210/198.2

OTHER PUBLICATIONS

Journal of Chromatography, 329 (1985) pp. 307-310, "Elsevier Science" Publishers B.V. Amsterdam.
Krohn et al. (International Laboratory) Oct. 1986, "Fraction Collectors in Automatic Preparative HPLC Systems", pp. 1-6.

Primary Examiner—Ernest G. Therkorn
Attorney, Agent, or Firm—Millen, White & Zelano

[57] ABSTRACT

A process and a device are described for the continuous separation, in the fluid phase, of a mixture of at least three constituents into three fractions.

A so-called simulated countercurrent technique is used in a separation column packed with a sorbent having five zones 6, 5, 4, 3 and 2 with different functions, and the following sequence of steps is performed: so-called strong solvent $S_2$ is introduced, a strong solvent extract $E_2$ is removed, the same solvent is introduced but at a lower temperature and/or at a lower pressure (so-called weak solven $S_1$), weak solvent extract $E_1$ is drawn off, the mixture to be separated is introduced, weak solvent raffinate R is drawn off and a stream Roy is recycled alternately to the feed for strong solvent $S_2$ and then to the feed for weak solvent $S_1$. A stream coming from zone 6 is sent alternately to an outlet for storng solvent extract $E_2$ and then to the inlet of the fifth zone. The various feeds and draw-offs are periodically caused to advance synchronously through the column.

Application especially to the separation of glucose, xylose and arabinose and to the purification of water containing phenol, paracresol and toluene.

10 Claims, 6 Drawing Sheets

CONTINUOUS PROCESS AND DEVICE FOR THE CHROMATOGRAPHIC SEPARATION OF A MIXTURE OF AT LEAST THREE CONSTITUENTS INTO THREE PURIFIED EFFLUENTS BY MEANS OF A SINGLE SOLVENT AT TWO DIFFERENT TEMPERATURES AND/OR AT TWO DIFFERENT PRESSURES

The present invention relates to a process and a device for the continuous separation, in the fluid phase (liquid, vapour or supercritical phase), of three or more than three components of a fluid mixture (liquid, vapour or supercritical mixture) with the aid of solid particles or a semisolid permeable gel capable of selectively adsorbing at least two compounds of the mixture, one of them very strongly, so simple elution is particularly ineffective at desorbing it. More especially, the invention relates to 1) the application of the so-called "simulated countercurrent" technique to the separations which have hitherto been performed by preparative elution gradient chromatography and which are encountered for example in pharmaceutical chemistry, in fine chemistry or in biochemistry. The invention further relates to 2) the conventional fields of application of the process for continuous preparation in the liquid phase using the simulated countercurrent system, with the proviso that the charges contain at least three constituents (for example, in the case of the aromatic C6 cut, it can be advantageous to separate off paraxylene, ethylbenzene and an orthoxylene/metaxylene mixture in a single continuous operation, another example being a xylose/arabinose/glucose mixture), and 3) the fields of application of preparative supercritical chromatography, which are still at the development stage, such as the production of flavours and essential oils.

More generally, this technique is applied in cases where there are at least three products which cannot be separated by distillation, either because their boiling points are too close or because they are thermally unstable.

The majority of large-tonnage adsorption apparatuses containing a solid adsorbent, which are used for example for the drying of gases, the adsorption of an organic substance, the separation of n-paraffins in the gas phase or hydrogen production by the intermittent application of pressure, are used in accordance with the technique which consists in employing several adsorption beds containing the solid adsorbent particles for carrying out adsorption, desorption and regeneration in the gas phase. However, it is more difficult to use this technique in the liquid phase because, even at the sorption stage, a substantial fraction of non-adsorbed charge remains in the space between the particles of the sorption phase and in the macropores of the particles. Under these conditions, it is very difficult to obtain the desired product with both a good yield and a good purity and at an advantageous energy cost.

To overcome this disadvantage, it is possible either to increase the number of reactors so as to be able to make purges, which are then recycled, or to carry out sweeps with another compound which in principle is non-adsorbable or only slightly adsorbable. This has the obvious disadvantage of complicating the procedure and increasing the cost of the subsequent distillation. It is therefore easy to understand that a sequential sorption/desorption process in which the liquid feed mixture either has a low separation factor or contains a substance which is very strongly retained by the adsorbent is incapable of producing effluents which have both a good purity and a high concentration.

In the case where it is desired to separate off only two different effluents, the processes based on the "simulated countercurrent", as described in U.S. Pat. Nos. 2,985,589, 3,696,107, 3,706,812 or 3,761,533 or in French patent 2 103 302, prove effective since they make it possible to achieve the continuous production of effluents which have a good purity and at the same time are in concentrated solution in the desorbent. U.S. Pat. No. 4,306,107 describes a process for the continuous separation of a mixture of four constituents, namely metaxylene, orthoxylene, paraxylene and ethylbenzene, by the simulated countercurrent technique in the presence of the solvent toluene. Three fractions are obtained, the first containing pure metaxylene recovered at a rate of 100%, the third containing pure ethylbenzene recovered at a rate of only 60% and the second comprising a mixture of paraxylene and orthoxylene recovered at a rate of 100%, but also ethylbenzene representing 40% of the initial quantity. This process therefore has the disadvantage that the least adsorbed product is only partially recovered and that a mixture is recovered in the intermediate fraction.

For small-tonnage adsorption apparatuses, with which products of high added value are manufactured a few kilos at a time, the problem is generally very different from the above. Fairly frequently, the aim is to isolate a particular pure product, of low concentration, from a mixture of at least about ten pure substances, for example products, in the last step of a synthesis. The modes of production are on the whole discontinuous and the cost of the solvent/purified product separation has little bearing on the final cost price. The object of the separation technique used is therefore essentially to separate off the desired product with primarily a good yield and then a good purity, the concentration in the separation solvent or solvents being taken into account either very little or not at all. The elution gradient technique, although complex, is often used in practice. It consists in sending a complex charge on to the column and then eluting with a first solvent which, having only a low affinity for the stationary phase, appreciably displaces only the substances which are poorly retained by this adsorbent. As this operation progresses, this first solvent is gradually replaced with a second solvent, which has a very high affinity for the adsorbent and which therefore displaces virtually all the substances contained in the charge as though they were not retained by the adsorbent at all. Hence it is the progressive and continuous variation of the solvent power and of the affinity of the eluent in the column which effects a gradual elution of the different products in the charge. The desired product will therefore be collected in the form of a particular fraction of the eluted stream. The next stage consists in reconditioning the column with the first of the two solvents. In addition, the column must be periodically regenerated because the stationary phases used are often susceptible to poisoning by traces of certain substances contained in the charge or in one or other of the two solvents. The elution gradient technique is capable of working according to several physical principles employed in liquid chromatography; the following may be mentioned in particular:

1) Gel permeation chromatography, which works according to the principle of exclusion: the large molecules, which are incapable of entering the cavities in the gel, are eluted first, while the smallest molecules, which pass through all the available cavities, are eluted last. The elution gradient can modify the phenomenon in two ways:

a) by acting on the molecules of the charge through increasingly strong solvation: molecules of initially identical radius of gyration, in a conformation of the "statistical" ball type, will become solvated and will unravel differently according to their functionality;

b) by acting on the stationary phase through progressive swelling of the gel: the size of the cavities will be progressively restricted, only molecules of decreasing size being retained.

2) Reversed-phase chromatography, which involves the partition coefficient of the solutes between an aqueous phase and an organic phase. A known example helps to separate a mixture of sparingly water-soluble organic products on a $C_{18}$ grafted silica by means of a water/methanol gradient. As the methanol concentration of the mobile phase increases, the most liposoluble products gradually become detached from the stationary phase.

3) Affinity chromatography, which involves either the Van der Waals type bonds or the "hydrogen" bonds between solute and stationary phase. When an apolar solvent of the hydrocarbon type is replaced with a polar solvent of the methylene chloride or chloroform type, increasingly polar solutes are eluted.

The elution gradient technique does not necessarily entail the use of two different solvents. It is possible to operate with a pH gradient, where the two solvents are replaced with two buffered solutions. It is also possible to operate with a pressure gradient (a single supercritical solvent) and make up with an "entrainer", generally in trace amounts (up to 3%).

The variety of stationary phases and solvent pairs is such that the majority of separations which were thought to be impossible 25 years ago are now performed. An example which may be mentioned is the resolution of enantiomers or racemic mixtures (with optically active stationary phases): "Preparative separation of enantiomers on axially compressed column", K. H. Rimböck, F. Kastner, A. Mannschreck, Journal of Chromatography No. 329 (1985) p. 307-310.

These methods have the disadvantage of not being continuous, although they can be automated [ref.: J. Krohn, F. Verillon (International Laboratory, October 1986)]. They are designed for the production of a few tens of kilograms per year at the very most, with a very flexible and versatile apparatus capable of being used for numerous different separations as required.

The prior art is also described by U.S. Pat. No. 4,498,991. According to said document, it is possible to obtain two fractions from a mixture containing three or more compounds in such a way that, to enable a multiconstituent separation to be performed, it is necessary to use one separation unit per constituent to be separated off, which is particularly expensive in terms of investment and solvents employed. According to another patent, namely French patent 2.274.331, it is also possible, by introducing two streams of solvents of different power into a simulated countercurrent apparatus, to effect the separation of a mixture to give a single effluent of good purity.

Finally, the prior art is illustrated by European patent A-0.290.684 and U.S. Pat. No. 3,728,843.

The object of the present invention is to overcome the above-mentioned disadvantages. In particular, one of the objects of the invention is to obtain three fractions from a mixture of at least three constituents (each fraction containing at least one constituent and the constituent or constituents of each fraction being recovered at a rate of approximately 100%).

A further object is to obtain an intermediate fraction, between the top fraction and the bottom fraction, which can contain a mixture of products recovered at a rate of approximately 100%. A further object is to obtain an intermediate fraction which can contain only one substantially pure constituent recovered at a rate of approximately 100%.

A further object is to improve the integration of the purge phases into the cyclic processes by producing an intermediate fraction or recycling it into the treatment.

In summary, the object of the invention is continuously to separate a charge consisting of a mixture of at least three products into three different effluents with a high degree of purity and in high concentration and with:

1) greater efficacy and simplicity than with the simple association of two conventional simulated countercurrent units in series;

2) a greatly reduced solvent consumption and a smaller quantity of stationary phase than with an isocratic discontinuous separation or an elution gradient separation.

In other words, the object of the invention is to combine the elution gradient and simulated countercurrent techniques in a single continuous process, without it being possible to consider that the invention is a simple juxtaposition of two different steps.

A further object of the invention is to bring about a substantial improvement to the conventional simulated countercurrent process (where only two effluents—a raffinate and an extract—leave the unit). In fact, the charge fairly frequently contains traces of a product which is very strongly adsorbed to the stationary phase. The resulting accumulation progressively lowers the performance characteristics of the unit and in the long term necessitates a shutdown for regeneration of the adsorbent. The invention makes it possible to avoid these shutdowns either by regenerating continuously or, preferably, by periodically applying a regeneration sequence which does not actually stop production.

In general terms, the invention relates to a process for the continuous separation, in the fluid phase, of a mixture or charge of at least three constituents into three fractions, wherein a fluid comprising said mixture and solvent are circulated in cocurrent over a sorbent contained in at least one separation column which has, at regularly spaced intervals, feed inlets for at least part of the fluid circulating downstream of these inlets, and draw-off outlets for at least part of the fluid circulating downstream of these inlets, said column having a link or loop for external circulation of the fluid between an upstream end and a downstream end, and said draw-off outlets and the feed inlets are caused to move in cocurrent under so-called simulated counter-current conditions, the constituents having degrees of strong, moderate and weak relative adsorption with respect to the sorbent and the solvent, the process being characterized by the following combination of steps:

a) Five contiguous zones 2, 3, 4, 5 and 6 are determined which have different functions and which are connected to one another in series so that said zones and the external link ensure continuity.

b) A zone 2 is determined for adsorption of the least adsorbed constituent or constituents in the column, said zone 2 being defined by a quantity of sorbent located between an outlet for a "weak solvent" raffinate R at an upstream end of this zone and an outlet for a recycling stream at a downstream end of said zone.

c) A zone 3 is determined for adsorption of the moderately adsorbed constituent or constituents in the column, said zone being defined by a quantity of sorbent located between an inlet for said mixture at an upstream end of said zone and the outlet for the weak solvent raffinate R, said zone 3 being situated immediately upstream of zone 2.

d) A zone 4 is determined for desorption of the least adsorbed constituent or constituents immediately upstream of zone 3, said zone 4 being defined by a quantity of sorbent located between said inlet for the mixture and an outlet for a so-called weak solvent extract $E_1$, defined below, at an upstream end of said zone 4.

e) A zone 5 is determined for desorption of the moderately adsorbed constituent or constituents immediately upstream of zone 4, said zone 5 being defined by a quantity of sorbent located between said outlet for the weak solvent extract $E_1$ and an inlet for a weak solvent feed at an upstream end of said zone 5.

f) A zone 6 is determined for desorption of the most adsorbed constituent or constituents immediately upstream of zone 5, said zone 6 being defined by a quantity of sorbent located between an outlet for a so-called strong solvent extract $E_2$, defined below, at a downstream end of said zone 6 and an inlet for a strong solvent feed at an upstream end of said zone.

g) The upstream end of zone 6 is fed with so-called strong solvent $S_2$, the upstream end of zone 5 is fed with the same so-called weak solvent $S_1$ and the upstream end of zone 3 is fed with said mixture, solvent $S_2$ being at a higher temperature and/or at a higher pressure than solvent $S_1$.

h) The mixture and a stream coming from zone 4 are circulated in zone 3 under adsorption conditions which are such as to permit the adsorption of the moderately adsorbed constituent or constituents in said zone 3, and raffinate R, comprising the least adsorbed constituent or constituents and part of solvent $S_1$, is drawn off from zone 3 and separated.

i) Strong solvent $S_2$ and at least part of the stream coming from zone 2 are circulated in zone 6 under desorption conditions which are such as to permit the desorption of the most adsorbed constituent or constituents in zone 6, and extracts $E_2$, comprising the most adsorbed constituent or constituents and the bulk of solvent $S_2$, is drawn off from zone 6 and separated.

j) Solvent $S_1$ and the remaining part of the stream coming from zone 6 are circulated in zone 5 under desorption conditions which are such as to permit the desorption of the moderately adsorbed constituent or constituents in zone 5, and extract $E_1$, comprising the moderately adsorbed constituent or constituents and part of solvent $S_1$, is drawn off from zone 5 and separated.

k) A stream coming from zone 5 is circulated in zone 4 under desorption conditions which are such as to permit the desorption of the least adsorbed constituent or constituents and the adsorption of the moderately adsorbed constituents.

l) The remaining part of the stream coming from zone 3 is circulated in zone 2 under adsorption conditions which are such as to permit the adsorption of the least adsorbed constituent or constituents in zone 2.

m) The inlet for the mixture, the outlet for raffinate R, the inlet for strong solvent $S_2$, the outlet for extract $E_1$ and the outlet for the recycling stream are periodically caused to advance synchronously through the column of sorbent in the direction of circulation of the mixture and the solvent so as to displace zones 2, 3, 4, 5 and 6 in the column of sorbent and produce the following three fractions: said raffinate R, said extract $E_1$ and said extract $E_2$, each of these fractions containing at least one constituent, the constituent or constituents of each fraction being substantially totally recovered.

Said process is further characterized in that the recycling stream removed at the downstream end of zone 2 is sent alternately to the upstream end of zone 6 and then to the upstream end of zone 5, and in that at least part of the stream removed at the downstream end of zone 6 is sent alternately to the upstream end of zone 5 and then to the outlet for the strong solvent $S_2$ extract $E_2$.

By following this procedure, essentially all the strong solvent is recovered from the volume between the particles of sorbent and contamination of zone 6, for adsorption of the most adsorbed constituent, with weak solvent is avoided.

More precisely, the following are introduced continuously in the liquid, vapour or supercritical phase:

1) two desorbing fluids which are identical except for their physical properties (temperature or pressure), are of the same chemical nature or of substantially identical composition in the case of a mixture, and which have different affinities for the stationary contact phases defined below (sorbent); reference is made here to strong solvent $S_2$ and weak solvent $S_1$, S being the same solvent;

2) a feed mixture containing at least three constituents, at least two of which are adsorbed in a broadly different way by the stationary contact phase defined below; these three flows are brought into contact with particles of sorbent and circulate through the zones defined above.

Strong solvent $S_2$ and weak solvent $S_1$ are generally understood as meaning two solvents which are of the same chemical nature or of the same composition in the case of a mixture, but which are used either at different temperatures, or at different pressures, or at different temperatures and pressures.

The so-called strong solvent $S_2$ will be the solvent used at a higher temperature and/or at a higher pressure or at a higher pressure and at a lower temperature than the weak solvent, while the latter will be the same solvent used at a lower temperature and/or at a lower pressure than the so-called strong solvent.

The solvent or desorbent used is discerningly selected according to the type of adsorbent, the separation of the constituents which is to be effected and the subsequent separation, for example distillation, of the solvent and the constituents.

The solvent can be selected for example from organic solvents, water and carbon dioxide.

This solvent, when referred to as the so-called strong solvent $S_2$, is generally used at a temperature which is at least 10° C. and advantageously 20° to 50° C. higher than that of the same so-called weak solvent $S_1$. Solvent $S_2$ according to the invention can also be used at a pressure which is at least 1 MPa and advantageously 2 to 20

MPa higher than that of the same so-called weak solvent $S_1$.

It can also be of value to combine a temperature and a pressure which are for example at least 10° C. and at least 1 MPa higher for the so-called strong solvent than for the so-called weak solvent. It is even possible to operate with a so-called strong solvent at a pressure which is at least 1 MPa higher and a temperature which is at least 10° C. lower than those recommended for the so-called weak solvent, the result necessarily being in all cases that the sorbent has a greater affinity for the so-called strong solvent than for the so-called weak solvent.

The solvent is generally miscible with the mixture. Normally, only one phase will be encountered at any one time in the space between the particles of sorbent.

This sorbent (adsorbent, absorbent or gel) is discerningly selected according to the separation of the constituents which is to be effected in a given solvent medium. It is generally selected from the group consisting of natural or synthetic zeolites, active charcoals, silicas, optionally grafted silica-aluminas, optionally bridged clays, optionally functionalized polymers and copolymers, such as polystyrene gel crosslinked with divinyl-benzene and, for example, sulphonated, ion exchange resins and mixtures thereof.

The particle size is normally between 1 micrometer and 1 cm and preferably between 5 micrometers and 1 millimeter. It is generally chosen with a view to making the optimum compromise between the separation and the acceptable pressure loss. The particles of sorbent can be of any shape and are preferably spherical.

The separation temperature and pressure are generally essentially between the use temperature and pressure of strong solvent $S_2$ and the use temperature and pressure of weak solvent $S_1$.

Each zone consists of at least one section and preferably of several sections (3 to 6) of equal volume connected in series, each section being packed with a mass of particles of a solid sorbent or a gel.

In general, according to the principle of simulated countercurrent, the time is divided into cycles, which are defined as the time after which the configuration of the unit becomes exactly identical again. Each cycle is divided into the same number of periods as there are sections in the unit. Each period defines the time elapsing between the section permutations from one zone to the next.

In each period, the unit is homothetic within itself, the number of sections in each zone remaining constant while the points of introduction and removal move by one section. During each period, the flow rates inside each zone remain constant.

According to the particular principle of the invention, each period is further divided into two or three steps, each step being defined as the time during which all the flow rates remain constant, it being understood that the flow rates are generally different in two successive zones.

The adsorption conditions and the desorption conditions according to the process of the invention generally involve feed and draw-off rates (produced by means for regulating these flow rates) which are such that the elution fronts move through the different zones from the upstream end to the downstream end of the column (direction of flow) at substantially the same speed.

According to one characteristic of the invention, it is possible to feed the different zones and recover the different effluents in the following way:

a) Zone 6 is fed during a first step at a flow rate $d_3 = d_1 + d_2$, where $d_1$ is the flow rate of the recycling stream coming from zone 2 and $d_2$ is the feed rate of strong solvent $S_2$, and then during a second step with strong solvent $S_2$ at a flow rate $d_3$ which is essentially identical to the flow rate in the first step, weak solvent is recovered during the first step and is sent to a storage reservoir, and the strong solvent extract $E_2$ is recovered during a second step and is separated to give the most adsorbed constituent or constituents.

b) Zone 5 is fed during a first step at a flow rate $d_5$, where $d_5 < d_3$, with at least part of the weak solvent originating from the above reservoir, and zone 5 is fed during the second step at a flow rate $d_1$ with the recycling stream coming from zone 2 and at a flow rate $d_4$, where $d_4 = d_5 - d_1$, with the remaining part of the weak solvent coming from the storage reservoir and then, if appropriate, with additional weak solvent, and at least part of the weak solvent extract $E_1$ is recovered at a flow rate $d_6$, where $d_6 < d_5$, and is separated to give the moderately adsorbed constituent or constituents.

c) Zone 4 is fed with the remaining part of the flow coming from zone 5 at a flow rate equal to $d_5 - d_6$, so as to give, at the outlet, a stream coming from zone 4 at the same flow rate.

d) Zone 3 is fed with said mixture at a flow rate $d_7$ and with said stream coming from zone 4 at a flow rate $d_5 - d_6$, i.e. a total flow rate $d_5 - d_6 + d_7$, and at least part of the weak solvent raffinate R is recovered at a flow rate $d_8$ and is separated to give the least adsorbed constituent or constituents, the flow rate $d_8$ being such that $d_8 + d_6 = d_4 + d_7$.

e) Zone 2 is fed with the remaining part coming from zone 3 at a flow rate equal to $d_5 - d_6 + d_7 - d_8$, i.e. $d_1$, and the recycling stream is recovered at a flow rate $d_1$ in order to feed zone 6 and then zone 5, as indicated in steps a and b.

The invention further relates to the device which makes it possible in particular to carry out the process continuously. It comprises a device for the continuous separation, in the fluid phase, of a mixture of at least three constituents into three fractions, characterized in that it comprises the following in combination: at least one separation column having five contiguous zones, each of which comprises at least 1 cylindrical section packed with a sorbent, each section being of essentially identical volume and having an inlet and an outlet, the outlet of one section being connected to the inlet of the next by a link 100 adapted for the circulation of the fluid in a given direction by virtue of non-return means 34 connected to this link, the inlet of each section possessing, downstream of these non-return means, means 38 for feeding mixture, means 36 for feeding so-called weak solvent $S_1$ and means 37 for feeding so-called strong solvent $S_2$, and the outlet of each section possessing, upstream of the non-return means, means 31 for drawing off a solvent $S_1$ extract $E_1$, means 30 for drawing off a solvent $S_2$ extract $E_2$, means 32 for drawing off a solvent $S_1$ raffinate R and means 33 for drawing off a recycling stream, at most either one of these feed means being adapted for delivering a feed or one of these draw-off means being adapted for delivering a draw-off, it being impossible for two or these means to act simultaneously between two given sections, the device being further characterized in that all these feed and draw-off means are arranged in such a way that:

a fifth zone 6 is delimited by an inlet connected to the means for feeding solvent $S_2$ and by an outlet connected to the means for drawing off strong solvent extract $E_2$;

a fourth zone 5, immediately downstream of the fifth zone, is delimited by an inlet connected to the means for feeding so-called weak solvent $S_1$ and by an outlet connected to the means for drawing off weak solvent extract $E_1$;

a third zone 4, immediately downstream of the fourth zone, is delimited by an inlet connected to the outlet of the fourth zone and by an outlet connected to the means for feeding mixture;

a second zone 3, immediately downstream of the third zone, is delimited by an inlet connected to the outlet of the third zone and by an outlet connected to the means for drawing off the weak solvent raffinate R;

a first zone 2, immediately downstream of the second zone, is delimited by an inlet connected to the outlet of the second zone and by an outlet connected to the means for drawing off recycling stream, the device being further characterized in that it comprises:

means for successive displacement, in the direction of circulation of the fluid, of said means for drawing off extract $E_1$, extract $E_2$, raffinate R and the recycling stream, on the one hand, and of said means for feeding solvent $S_1$, solvent $S_2$ and mixture, on the other, these means being adapted for creating so-called simulated countercurrent conditions, and the device being further characterized in that it comprises means adapted for connecting the outlet of the first zone 2 alternately to the inlet of the fifth zone 6 and then to the inlet of the fourth zone 5, and in that it comprises means adapted for connecting the outlet of the fifth zone 6 alternately to the inlet of the fourth zone 5 and then to the means for drawing off the strong solvent extract $E_2$.

The total number of column sections is chosen according to the complexity of the mixture. Preferably, this number of sections is between 4 and 24. The column sections are generally of the same cross-section and of cylindrical shape. An external link connects each section and can advantageously comprise all the means for feeding solvent and mixture, downstream of the above-mentioned non-return means. The link can advantageously comprise all the above means for drawing off extracts, raffinate and recycling stream, upstream of the non-return means.

According to another characteristic of the invention, the means for feeding solvent $S_2$ generally comprise heating means 45 and/or pressurizing means connected to a feed for solvent $S_2$, and the means for feeding solvent $S_1$ comprise cooling means and/or pressurizing means connected to its feed, the latter means being adapted for creating a lower pressure than that obtained for solvent $S_2$.

The invention will be understood more clearly in the light of FIGS. 1, 2, 3, 4, 5 and 6, which illustrate the process and the device without implying a limitation:

DESCRIPTION OF THE PREFERRED EMBODIMENTS

Figure 2:
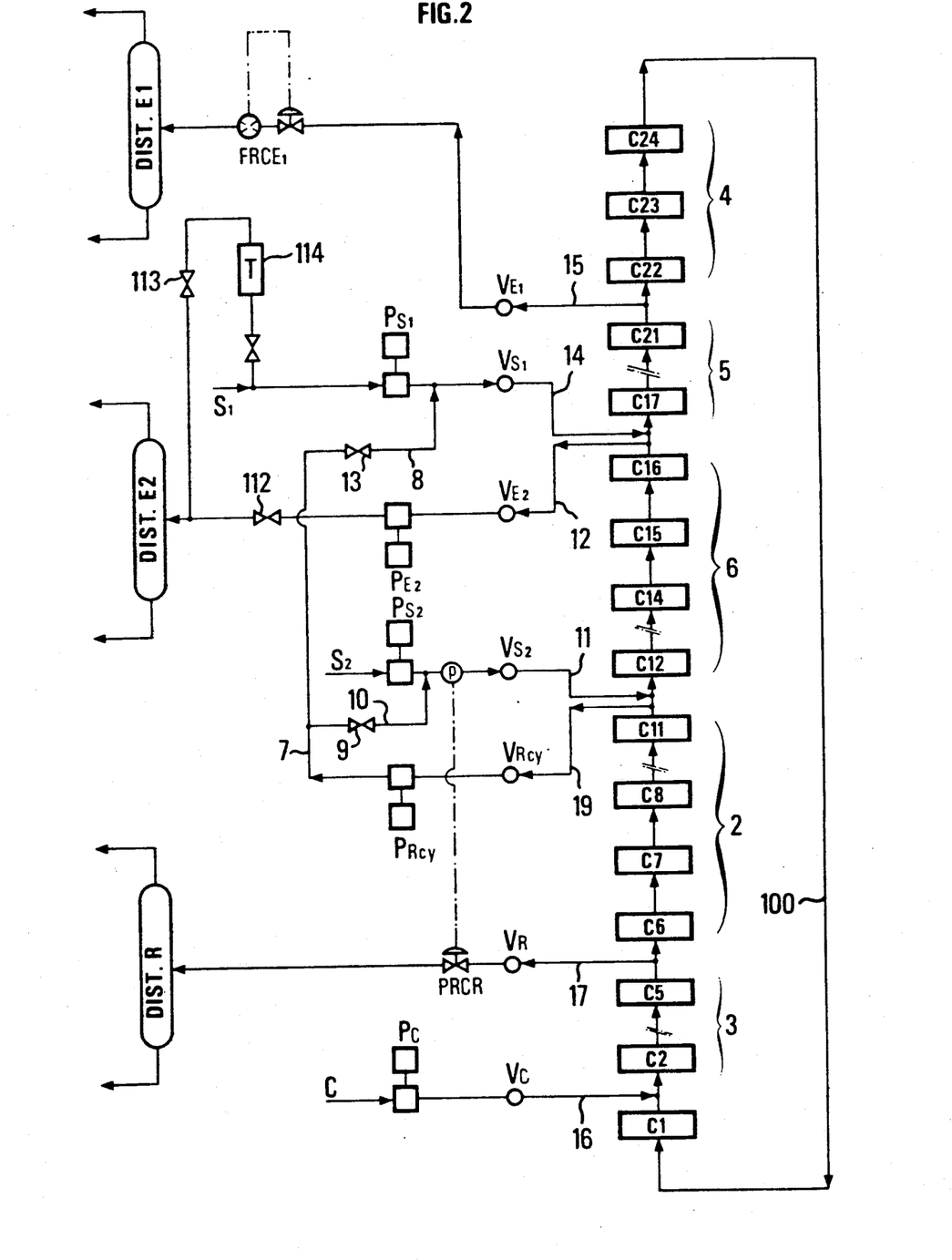
FIG. 2 shows the flow chart of the mode of carrying out the invention at a given instant. This chart shows 24 sections (5 in zone 6, 5 in zone 3, 4 in zone 4, 4 in zone 3 and 6 in zone 2); the twelfth period of the cycle is arbitrarily designated as corresponding to the introduction of solvent at high temperature, i.e. to the start of zone 6 in section 12.

As indicated in FIG. 2, which arbitrarily relates to the 12th period of the cycle, the system according to the invention for separation by sorption essentially comprises columns packed with particles of solid adsorbent or with gel or semisolid adsorbent divided into 5 zones:

Zone 6 in which the most strongly adsorbed product is desorbed by the strong solvent.

Zone 5 in which the moderately adsorbed product is desorbed by the weak solvent.

Zone 4 in which the slightly adsorbed or non-adsorbed product is desorbed by the weak solvent and the moderately adsorbed product.

Zones 4 and 5 are also zones in which the most strongly adsorbed product is retained.

Zone 3 in which the strongly and moderately adsorbed products are adsorbed.

Zone 2 in which the slightly adsorbed (or non-adsorbed) product is adsorbed or eliminated, and column reconditioning zone or zone in which the strong solvent is desorbed by the weak solvent.

The flows of the various fluids are as follows:

Zone 6: Strong solvent $S_2$ is pumped by pump $PS_2$; during the first step of the period, recycling stream 10 is added via lines 19 and 7 and the pressure of stream 11 is measured in order to be regulated. This flow is sent through valve $VS_2$ to the inlet of section $C_{12}$. In the second step of each period, valve 9 is closed and strong solvent is sent to the inlet of $C_{12}$.

At the outlet of section $C_{16}$ selected by valve $VE_2$, pump $PE_2$ discharges the whole of the flow through line 12. During the first step of the period, valve 112 is closed, valve 113 is open and this flow is directed to buffer reservoir 114. During the second step of the period, valve 113 is closed, valve 112 is open and the flow is directed to distillation column DIST. $E_2$, which separates the strong solvent from the most strongly adsorbed product.

Zone 5: Pump $PS_1$ supplies the contents of buffer reservoir 114 during a first part of the period and weak solvent $S_1$ during a second part of the period. During the first step of each period, valve 13 is closed, whereas, during the second step of each period, it is open and recycling stream 8 coming from zone 2 via lines 19 and 7 is added to line 14. The whole of the flow in line 14 is directed by valve $VS_1$ to the inlet of section $C_{17}$.

At the outlet of section $C_{21}$, the flow is divided into two, one part of which passes through line 15 directed by valve $VE_1$ to flow rate regulator FRCE, which is composed of a rotary valve, a flow meter situated downstream, and a regulator. This flow ends up in distillation column DIST. $E_1$, which separates the weak solvent from the moderately adsorbed product.

Zone 4: The other part of the flux coming from section $C_{21}$ flows to $C_{22}$ and the whole of it leaves this zone at the outlet of section $C_1$.

Zone 3: A charge stream is added to the entire flow coming from $C_1$, at the inlet of section $C_2$, by charge pump PC and by means of line 16 directed by valve VC.

At the outlet of section $C_5$, part of the flow is removed through line 17 directed by valve VR. This raffinate stream is expanded through pressure regulating valve PRCR; with the pressure being measured on line 11, the flow of raffinate discharges to distillation column DIST. R, which separates the weak solvent from the slightly adsorbed or non-adsorbed product.

Zone 2: This zone advantageously comprises at least four sections. The other part of the flow coming from $C_5$ continues into section $C_6$. At the outlet of section $C_{11}$, valve VRcy directs line 19, which enables the whole of the flow coming from section $C_{11}$ to be removed by means of pump PRcy. Downstream of this pump, line 7 makes it possible to join up either with line 10 during the first step of the period (valve 9 open, valve 13 closed) or with line 8 during the second part of the period (valve 9 closed, valve 13 open).

Figure 1:
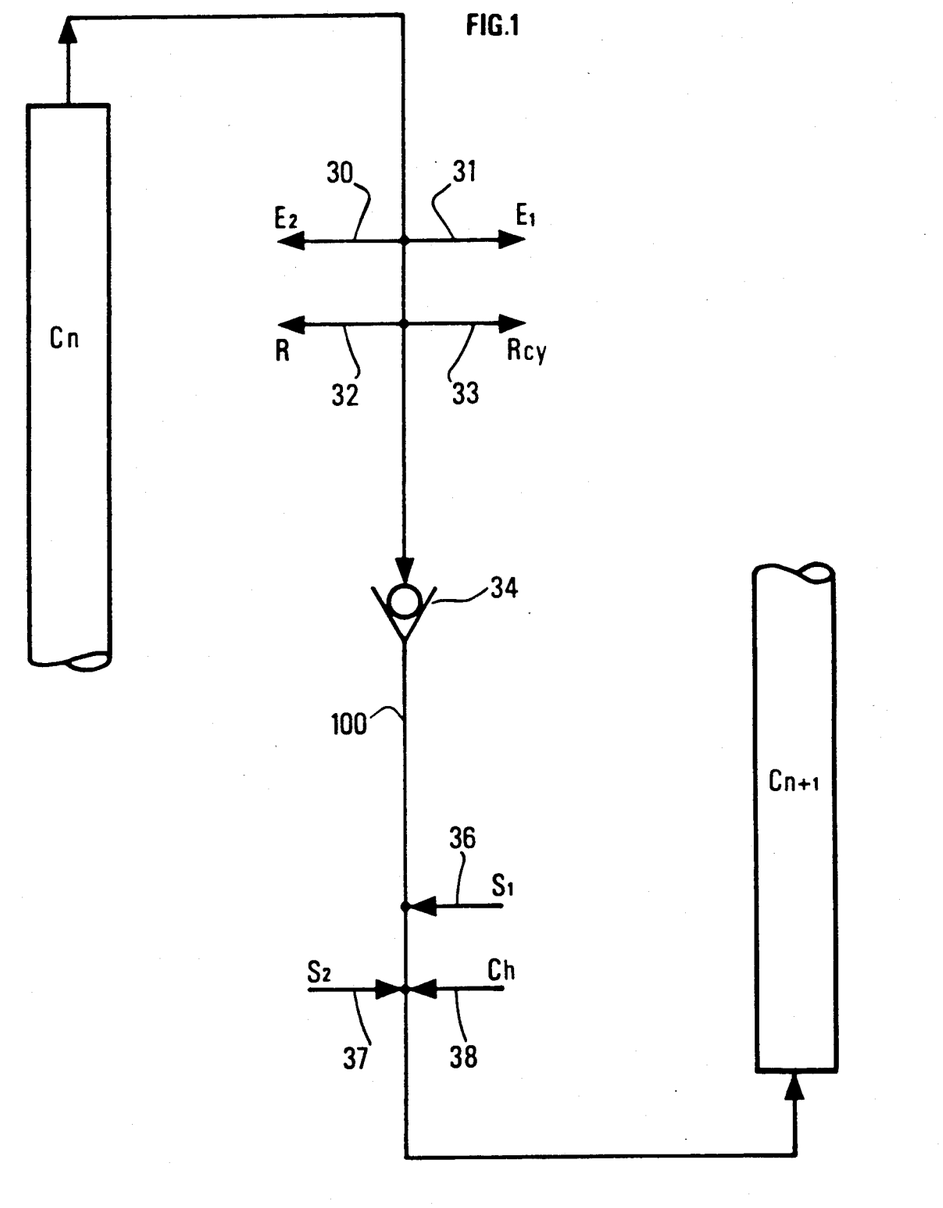
FIG. 1 shows the detail of the arrangement between two successive sections according to the mode of carrying out the invention.

The arrangement of the links between every two sections of this mode of carrying out the invention is shown in FIG. 1.

The twenty-four periods of the cycle between sections $C_6$ and $C_7$ proceed as follows:

Period 1: Junction $C_6$–$C_7$ in zone 5; the whole of the flow passes through check valve 34; the flow rate is zero in lines 30 to 33 and 36 to 38.

Period 2: Junction $C_6$–$C_7$, corresponding to the junction between zone 5 and zone 6; the whole of the flow leaving section $C_6$ is removed through line 30, which then coincides with line 12; the flow rates in lines 31 to 33 and in the check valve are zero; the total flow entering section $C_7$ passes through line 36, which then corresponds to line 14; the flow rates in lines 37 and 38 are zero.

Periods 3 to 6: Junction $C_6$–$C_7$ in zone 6; the whole of the flow passes through check valve 34; the flow rate is zero in lines 30 to 33 and 36 to 38.

Period 7: Junction $C_6$–$C_7$, corresponding to the junction between zone 6 and zone 2; the whole of the flow leaving section $C_6$ is removed through line 33, which then corresponds to line 19; the flow rates in lines 30 to 32 and check valve 34 are zero; the total flow entering section $C_7$ passes through line 37, which then coincides with line 11; the flow rates in lines 36 and 38 are zero.

Periods 8 to 12: Junction $C_6$–$C_7$ in zone 2; the whole of the flow passes through check valve 34; the flow rates are zero in lines 30 to 33 and 36 to 38.

Period 13: Junction $C_6$–$C_7$, corresponding to junction between zones 3 and 2; one part of the stream coming from section 6 is removed through line 32, which thus coincides with line 17; the flow rates in lines 30, 31 and 33 are zero; the other part of the stream coming from section $C_6$ passes through check valve 34 to enter section $C_7$; the flow rates in lines 36 to 38 are zero.

Periods 14 to 16: Junction $C_6$–$C_7$ in zone 3; the whole of the flow passes through check valve 34; the flow rates are zero in lines 30 to 33 and 36 to 38.

Period 17: Junction $C_6$–$C_7$, corresponding to the junction between zone 3 and zone 4. The whole of the flow coming from section $C_6$ passes through check valve 34. The flow rates are zero in lines 30 to 33. A charge stream is added to this flow through line 38, which then coincides with line 16; the flow rates in lines 36 and 37 are zero.

Periods 18 to 20: Junction $C_6$–$C_7$ in zone 4. The total flow passes through check valve 34; the flow rates are zero in lines 30 to 33 and 36 to 38.

Period 21: Junction $C_6$–$C_7$, coinciding with the junction between zone 4 and zone 5. One part of the stream coming from section $C_6$ is removed through line 31, which then corresponds to line 25; the flow rates in lines 30, 32 and 33 are zero. The other part of this stream passes through check valve 34; the flow rates are zero in lines 36 to 38.

Periods 22 to 24: Junction $C_6$–$C_7$ in zone 5. The total flow passes through check valve 34; the flow rates are zero in lines 30 to 33 and 36 to 38.

At the end of the twenty-fourth period, the cycle is complete and the final movement of valves $VS_2$, $VE_2$, $VS_1$, $VE_1$, VC, VR and VRcy brings junction $C_6$–$C_7$ back to its initial configuration; this is the start of another cycle.

Figure 3:
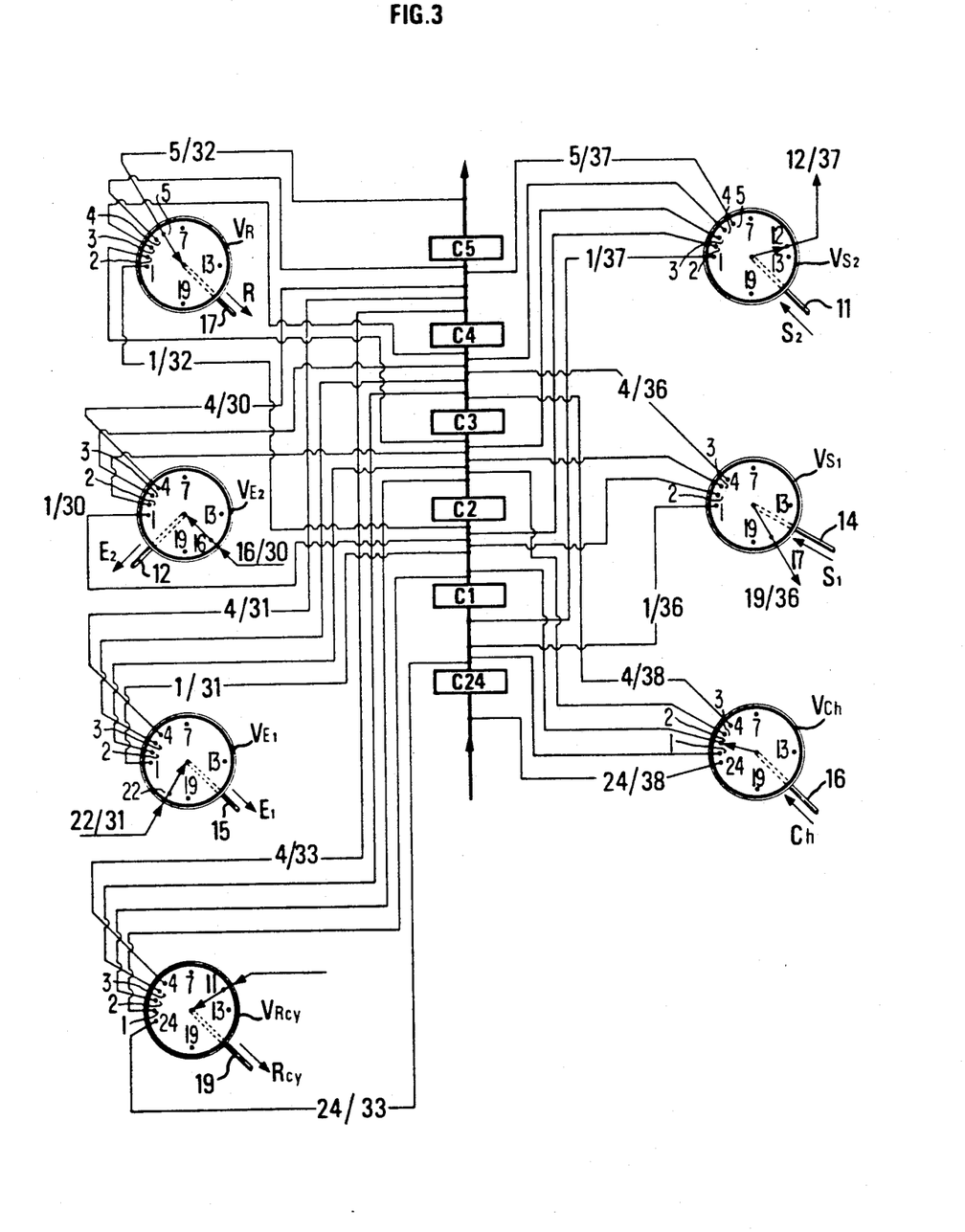
FIG. 3 is a detailed diagram of the connection of the different sections to the seven rotary valves for carrying out the invention.

FIG. 3 shows a detailed diagram of the process according to the mode of carrying out the invention which is shown in FIGS. 1 and 2. The numbering of the lines combines those of FIGS. 1 and 2. Thus the removal of strong solvent extract still corresponds to the suffix 30, the removal of weak solvent extract still corresponds to the suffix 31, the removal of raffinate still corresponds to the suffix 32, the removal of the recycling stream corresponds to the suffix 33, the addition of weak solvent still corresponds to the suffix 36, the addition of strong solvent still corresponds to the suffix 37 and, finally, the addition of the charge stream still corresponds to the suffix 38. Furthermore, the prefixes indicate the number of the section which a stream will enter or which it has left. For example, line 3/36 denotes the link between the weak solvent valve $VS_1$ and the inlet of section $C_3$, and line 1/31 denotes the link between the outlet of section $C_1$ and the weak solvent extract valve $VE_1$.

Moreover, the common inlet of the charge valve is still called 16, the common inlet of the weak solvent valve is still called 14 and the common inlet of the strong solvent valve is still called 11, while the common outlets of the raffinate, strong solvent extract, weak solvent extract and recycling valves are still called 17, 12, 15 and 19 respectively.

Thus, in the comments on FIGS. 1 and 2, when it is stated that, in period 13, junction $C_6$–$C_7$ corresponds to the junction between zone 2 and zone 3 and that lines 32 and 17 therefore coincide, it must be understood that valve VR brings lines 6/32 and 17 into communication and that line 17 is thus extended, for the duration of this 13th period, up to the outlet of zone 6. According to this Figure, it is easy to see that for 24 sections and 7 rotary valves, 168 lines of this type connect each section to each valve.

Figure 4:
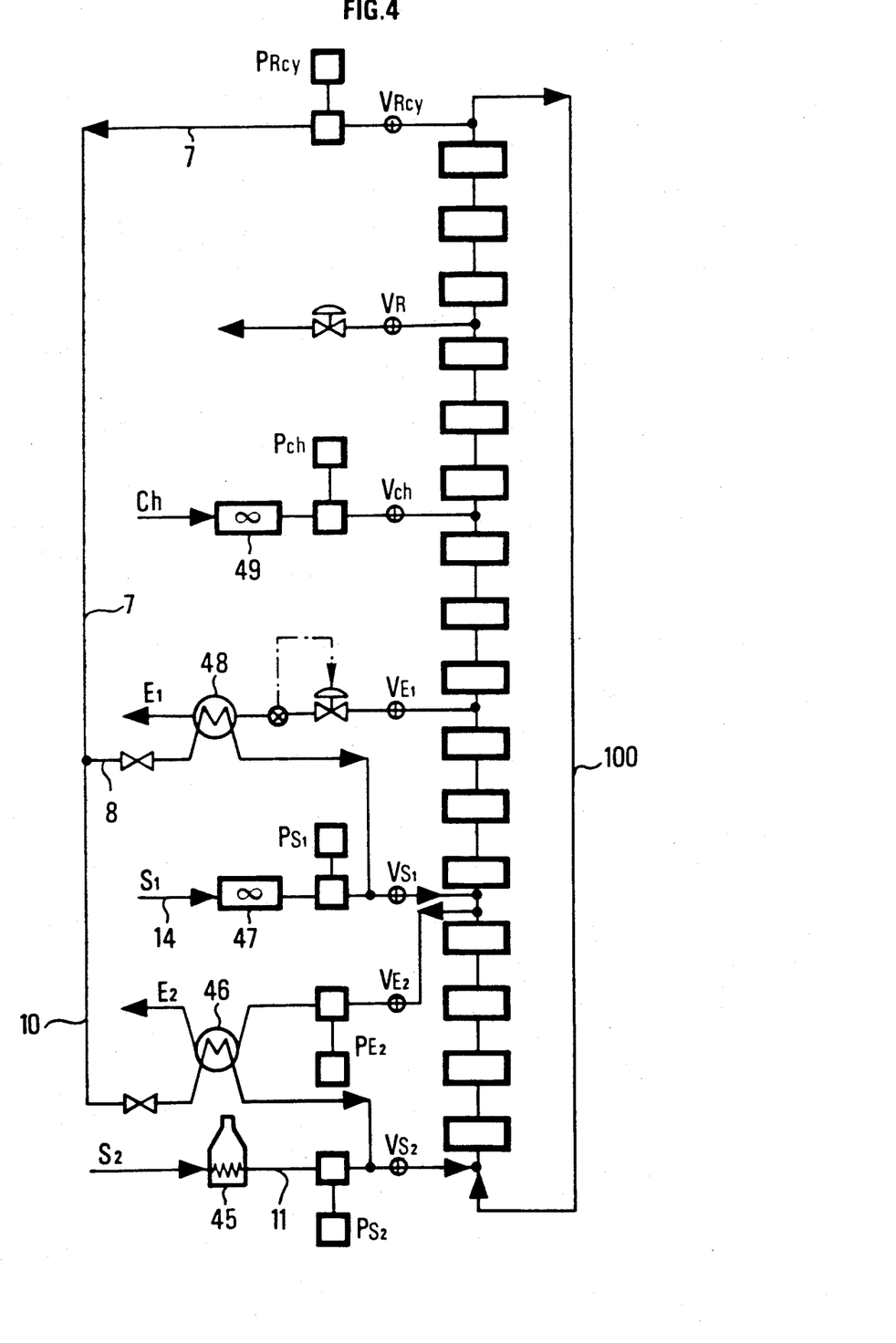
FIG. 4 shows an example of how to carry out the process with hot solvent ($S_2$) and the same solvent at a lower temperature ($S_1$).

FIG. 4 shows the preferred variant of the mode of carrying out the invention.

Figure 5:
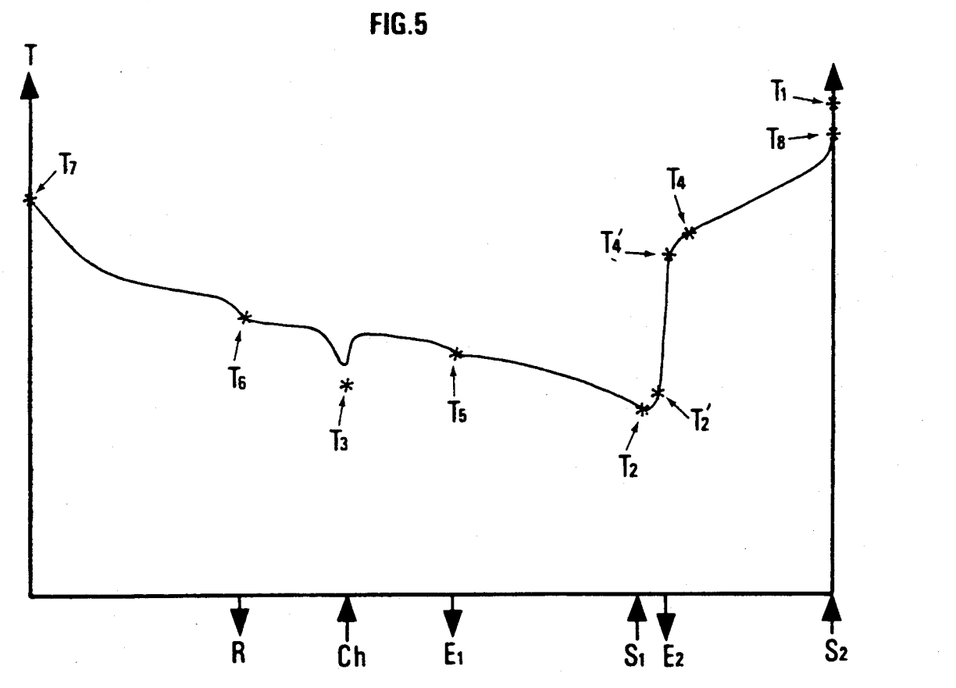
FIG. 5 shows a temperature profile in the different zones of the separation column.

FIG. 5 shows an example of a desirable temperature profile in the five zones characterizing the process.

FIG. 4 according to a preferred mode of carrying out the invention reproduces FIG. 2 in a simplified form, but additionally shows oven 45, exchangers 46 and 48 and condensers 47 and 49. When strong solvent $S_2$ and weak solvent $S_1$ are of the same nature, the only difference arises for example from two substantially different injection temperatures $T_1$ and $T_2$, where $T_2 > T_1$.

The following enter zone 6 during the first step of each period: via line 10 a recycling stream coming from zone 2, which is initially at the temperature $T_7$, it being possible, if appropriate, for this temperature to be regulated by heat exchange with extract 2 (temperature $T_4$) coming from zone 6, by means of exchanger 46, and via line 11 a solvent stream heated by oven 45. The temperature at the outlet of oven 45 must be such that, at the inlet of zone 6, the temperature of line 11, i.e. $T_1$, is ensured in a stable manner.

During the second step of each period, valve 9 is closed and the only solvent stream is provided by line 11. Throughout the period, the flow rate and the temperature at the inlet of zone 6 are kept constant.

At the outlet of zone 6, the temperature varies constantly throughout the period between $T'_2$ and $T_4$, where $T'_2 < T_4$; during the first step, the temperature is between $T'_2$ and $T'_2 + (T'_2 + T'_4)/2$; during the greater part of this first step, the temperature is maintained between $T'_2$ and $(T'_2 + T'_4)/5$; at the end of the first step, the temperature rises very rapidly from $T'_2 - (T'_2 + T'_4)/5$ to $T'_2 + (T'_2 + T'_4)/2$. Throughout the first step, the flow coming from zone 6 is sent to reserve 114, valve 113 being open and valve 112 being closed. During the second step of the period, the temperature of the flow coming from zone 6 to line 12 changes abruptly from $T'_2 + (T'_2 + T'_4)/2$ to $T'_4$, after which the temperature remains between $T'_4$ and $T_4$ for most of the period. During this second step, the most strongly adsorbed substance leaves zone 6, valve 113 is closed, valve 112 is open and the solvent is separated from the most strongly adsorbed solute in distillation column DIST. $E_2$.

During a first part of the period, the solvent contained in reserve 114 is introduced into zone 5, at a temperature slightly above $T'_2$, by pump $PS_1$ and valve $VS_1$ through line 14. To bring the average temperature of the first section of zone 5 back to $T'_2$, solvent cooled by the condenser 47 to the temperature $T_2$ is introduced during the second part of the period. Throughout the duration of the period, the flow rate at the inlet of zone 5 is kept constant. At the outlet of zone 5, one part of the flow is removed via line 15, valve $VE_1$ and the flow regulation assembly $FRCE_1$ and sent to distillation column DIST. $E_1$, where the solvent and the moderately adsorbed solute are separated.

The second part of the flow coming from zone 5 circulates into zone 4; its temperature is $T_5$, where $T_5$ is slightly above $T'_2$. At the outlet of zone 4, the whole of the flow is sent to zone 3. Charge at the temperature $T_3$, where $T_5 > T_3 > T'_2$, is added by means of charge pump PC and valve VC via line 16. At the outlet of zone 3, one part of the flow coming from zone 3 is removed, via line 17, by means of valve VR and pressure regulating device PRCR and sent to distillation column DIST. R, where the solvent and the slightly adsorbed or non-adsorbed solute are separated. The second part of this flow continues to zone 2, where the temperature rises from $T_6$ to $T_7$ because the temperature in the final section of zone 2 is initially $T_6$, where $T_8$ is slightly below $T_1$.

Figure 6:
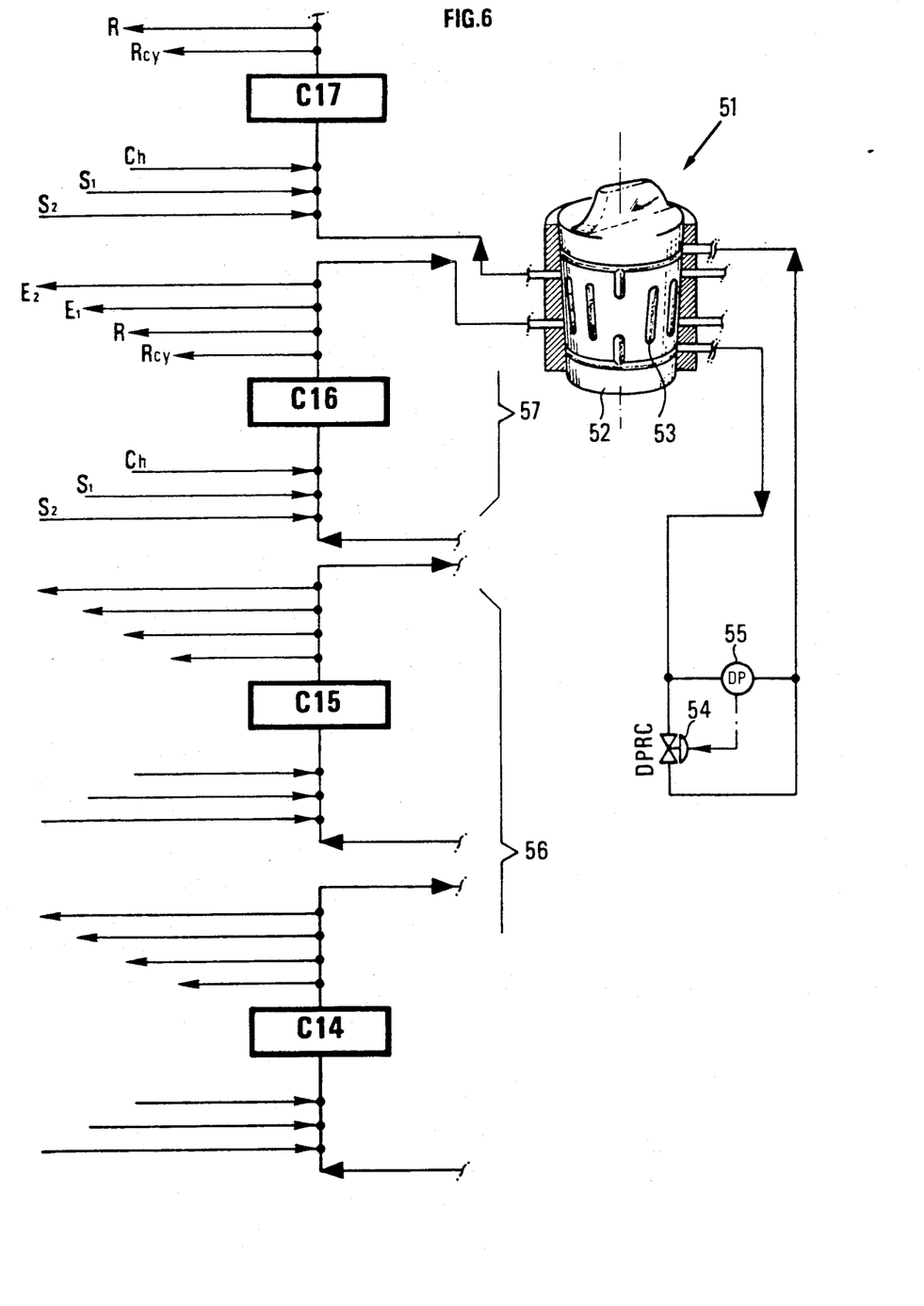
FIG. 6 shows a particular valve which makes it possible to work at substantially different pressure levels between two successive sections, for example when strong solvent $S_2$ is an amply supercritical fluid while the weak solvent consists of the same fluid but slightly subcritical.

FIG. 6 shows a conical valve casing and an arrangement of the sections. This particular type of valve and the related arrangement of the sections represent a variant of the mode of carrying out the invention. The object here is to obtain, in zone 6, a pressure level which is appreciably higher than in the other zones. According to the invention, strong solvent $S_2$ may be supercritical in zone 6, whereas weak solvent $S_1$ will be the same fluid but slightly subcritical, in zones 5, 4, 3 and 2; another possibility will consist in taking, as strong solvent $S_2$, a fluid which is amply supercritical in zone 6, for example $CO_2$ at 130 bar and 35° C., and, as weak solvent $S_1$, the same fluid just above its critical point, for example $CO_2$ at 80 bar and 35° C. The valve described in FIG. 6 is inserted just upstream or downstream of check valve 34 (FIG. 1). Only sections 13 to 17 have been shown. In the position shown, sections 13 to 15 are in a high-pressure zone, while columns 16 and 17 are in a low-pressure zone. The flow between sections 13 and 14, 14 and 15 and 16 and 17 takes place as if through a simple connecting pipe 53, whereas between sections 15 and 16, a pressure regulating valve 54 and a differential pressure regulator and sensor 55 make it possible to regulate a pressure difference between the upstream zone 56 and downstream zone 57. When this valve rotates clockwise by one position, the pressure difference will be regulated at the junction of zones 16 and 17. Of course, to create such a high-pressure zone 57, it will be necessary to remove a recycling stream at the end of zone 2 by the recycling valve, the pressure of which stream will be increased by means of the recycling pump, and/or to send strong solvent at an appropriate pressure by the valve for strong solvent $S_2$. The casing of valve 51 shown therefore permits a simple flow inside the conical casing 53 in all but one position. In one particular position, the flow entering the valve is directed to an external loop for differential pressure regulation, 54 and 55, after which the expanded fluid passes back through valve 51 to the corresponding outlet.

The following Examples illustrate the invention without implying a limitation.

EXAMPLE NO. 1

The object is to separate a mixture of 12% of glucose, 78.5% of xylose and 9.5% by weight of arabinose in an aqueous solution with a solids content of 400 g/l, on an ion exchange resin (cationic) exchanged with calcium. The operation is carried out in accordance with the diagram of FIG. 1. The strong solvent and the weak solvent are both softened water, the difference in eluting power being due to the temperature. There are 24 jacketed columns, the temperature is imposed by external water circulation and each column can therefore be thermostated either at 35° C. or at 75° C. The columns have an internal diameter of 1.6 cm and exhibit the feature of being axially compressed to adapt to the variations in apparent volume of the active phase, which can be as much as 2.8%. Each period lasts 37 minutes 30 seconds and the complete cycle consists of 24 periods (see FIG. 2), i.e. 15 h. By way of example, only the first period of the cycle is briefly described. During this period, zone 6 consists of the first five columns $C_1$ to $C_5$, thermostated at 75° C. During the first step of each period (duration: 33 min 09 sec), a recycling stream coming from zone 2 (flow rate: 3.225 cm$^3$/min) and a make-up of softened water (flow rate: 1.415 cm$^3$/min) are sent to column $C_1$. During the second step of the period (33 min 10 sec to 37 min 30 sec), softened water is sent to the column at a rate of 4.64 cm$^3$/min. Throughout the duration of the period, the flow rate in zone 6 is therefore 4.64 cm$^3$/min. At the outlet of column 5, the whole of this flow is removed during a first part of the period (from t=0 to t=7 min 12 sec) and sent to a buffer reservoir (this time corresponds to the fact that the outlet temperature of column 5 takes a little more than 7 minutes to rise from 35° C. to 60° C.). During the remainder of the period, a flow is produced (4.64 cm$^3$/min) which has the following average composition: xylose 0.27 g. l$^{-1}$, arabinose 1.87 g. l$^{-1}$, calcium about 7 ppm by weight of Ca(OH)$_2$.

During period 1, zone 5 consists of columns 6 to 10, thermostated at 35° C. During a first part of the period (from t=0 to t=8 min 19 sec), the whole of the liquid contained in the buffer reservoir is introduced into column 6 at a rate of 4 cm$^3$/min; during a second part of the period (from t=8 min 20 sec to t=33 min 10 sec), softened water is introduced at a rate of 4 cm$^3$/min; finally, from t=33 min 11 sec to t=37 min 30 sec, the recycling stream coming from zone 2 (flow rate: 3.225 cm$^3$/min) and a make-up of softened water (flow rate: 0.775 cm$^3$/min) are introduced. Inside zone 5, the constant flow rate has a value of 4 cm$^3$/min. At the outlet of this zone, an extract stream is removed (flow rate: 0.746 cm$^3$/min) which has the following composition: glucose 0.93 g. l$^{-1}$, xylose 86.9 g. l$^{-1}$, arabinose 1.42 g. l$^{-1}$, calcium about 6 ppm by weight of Ca(OH)$_2$. During period 1, zone 4 consists of columns 11 to 14 (thermostated at 35° C.). At the inlet of this zone, a recycling stream coming from zone 5 is supplied at a flow rate of 3.254 cm$^3$/min. This flow rate remains constant throughout zone 4 and the flow is directed, at the outlet of said zone, to zone 3. During period 1, zone 3 consists of columns 15 to 18 (thermostated at 35° C.). At the inlet of this zone, charge (flow rate: 0.213 cm$^3$/min) is added to the recycling stream coming from zone 4 (flow rate: 3.25 cm$^3$/min). The charge has the following composition: xylose 314 g. l$^{-1}$, glucose 48 g. l$^{-1}$, arabinose 38 g. l$^{-1}$. The flow rate inside zone 3 is 3.467 cm$^3$/min. At the outlet of zone 3, a raffinate stream is removed (flow rate: 0.24 cm$^3$/min) which has the following composition: glucose 39.95 g. l$^{-1}$, xylose 4.14 g. l$^{-1}$, calcium about 6 ppm by weight of Ca(OH)$_2$. During period 1, zone 2 consists of columns 19 to 24, thermostated at 35° C. The flow rate at the inlet of column 19 is 3.225 cm$^3$/min, the flow being a recycling stream coming from zone 3. Inside the zone, the flow rate is constant at 3.225 cm$^3$/min. At the outlet of zone 2, the stream is recycled to the inlet of zone 6 from t=0 to t=33 min 10 sec and then to the inlet of zone 5 during the end of the period.

EXAMPLE NO. 2

Water contaminated with phenol (0.57% by weight), orthocresol (0.34% by weight) and toluene (0.05% by weight) is treated on active charcoal of high specific surface area (530 m$^2$/g, measured by the BET method). This adsorbent is regenerated with supercritical carbon dioxide at a temperature of about 50° C. and a pressure of the order of 14.5 megapascals.

Each section consists of a stainless steel column 1.5 m in height and 30 cm in diameter, into which about 60 kg of active charcoal, in the form of a powder with a particle size of between 0.2 mm and 0.5 mm, have been charged. There are 24 columns of this type, connected to one another by the devices described in FIGS. 1, 2 and 3 and a valve such as the one described in FIG. 6. The arrangement of the process is similar to those shown in FIGS. 1 and 2, but with very simplified effluent separations (separation flasks). Each of the periods lasts 13 minutes 10 seconds.

During the first period of the cycle, the contaminated water is supplied to the inlet of section 1 by means of the charge pump and valve, and clean water is collected at the outlet of section 15 (residual contents of impurities: phenol 0.7 ppm, orthocresol 0.4 ppm, toluene 1.2 ppm; CO$_2$ content: 0.45%). This assembly forms zone 3. The flow rate of contaminated water is 5 m$^3$/h; the pressure is of the order of 1.2 MPa at the inlet of section 1 and 0.3 to 0.4 MPa at the outlet of section 15, while the temperature of this charge can vary from 5° C. to 35° C. The flow rate of clean water at the outlet of column 15 is approximately 4.95 m$^3$/h: 4.75 m$^3$/h are produced in the form of raffinate and 0.2 m$^3$/h passes to section 16. The columns are arranged vertically; the inlet is in the bottom part and the outlet in the top part. The 4.75 m$^3$/h of clean water are sent to a gas/liquid separator operating at atmospheric pressure and at ambient temperature, from which about 8 m$^3$/h of gaseous CO$_2$ and 4.73 m$^3$/h of water, now containing only 0.13% of CO$_2$, are recovered.

Zone 2 consists of columns 16 and 17. At the inlet of this zone, a clean water stream arrives from zone 3 at a flow rate of about 0.2 m$^3$/h. The outlet of zone 17 is connected to recycling valve VRcy. At the start of the period, the pressure in column 17 is 14 MPa. Recycling valve VRcy connects the outlet of column 17 to recycling pump PRcy, which is capable of pumping a two-phase mixture. During the first step of the period, the recycling pump returns supercritical CO$_2$, containing 0.47% by weight of phenol, 0.28% by weight of orthocresol, 0.02% by weight of toluene and 0.01% of water, to zone 6 (section 1); the pressure in column 17 drops from 14.5 MPa to 7.5 MPa, while the pressure in column 16 rises from 0.2 to 0.8 MPa. During this first step, the recycling stream is one-phase. During the second step of the period, the recycling pump is cut out; a mist of subcritical CO$_2$ and water (two-phase mixture) is expanded to zone 5 (section 23); at the end of the second step, the pressure in section 17 is of the order of 3.6 MPa. Finally, in the third step, a compressor sucks the CO$_2$ remaining in section 17 through the recycling valve and returns it to zone 5. At the end of this third step, the pressure in sections 16 and 17 is about 0.15 MPa. In the second and third steps of the period, the average composition of the stream recycled to zone 5 is as follows: CO$_2$ 95.5%, H$_2$O 4.15%, phenol 0.19% by weight, orthocresol 0.14% by weight, toluene 0.02% by weight.

Zone 6 consists of sections 18 to 22. The flow rate at the inlet of zone 6 is 2675 kg/h of 99.2% CO$_2$, the remainder consisting of the impurities phenol, orthocresol, toluene and, in particular, water. During the first step of the period, part of this flow originates from the recycling stream coming from zone 2, and the bulk of the stream consists of strong solvent, the whole passing through the strong solvent valve VS$_2$. During the 2nd and 3rd steps of the period, the whole of the flow originates from the strong solvent stream. On average over the period, the input of strong solvent represents 2575 kg/h of CO$_2$ of good purity and the recycling stream represents 100 kg/h. The physical characteristics of the fluid entering zone 6 are as follows: P=14.5 MPa, T=50° C., =0.68 kg/dm$^3$. The strong solvent extract is collected at the outlet of section 22. During the first 20 seconds, the pressure is allowed to finish building up in the column; during the next 40 seconds, a valve analogous to that of FIG. 6 makes it possible to expand the whole of the flow, which passes to zone 5 at 2.5 MPa. Finally, during the remainder of the period, 2645 kg/h of a mixture of $CO_2$, phenol, orthocresol, toluene and water, containing about 96.4% by weight of $CO_2$, is drawn off. (The $CO_2$ content is of the order of 99% by weight in the first cycle, about 98.1% by weight in the second and 97.3% by weight in the third; the stable value of 96.4% of $CO_2$ is not reached until the 5th cycle.) This stream is discharged through the multiposition valve $VE_2$ and a mass flow regulator situated downstream of this valve. This flow is sent to separator $B_{12}$, where isenthalpic expansion takes place (monitored pressure: 7.8 MPa; resulting temperature: 36° C.). Two phases are obtained: the light phase, with a density of 0.38 g/cm³ and a composition of 99.18% of $CO_2$, is produced at a flow rate of 2525 kg/h, while the heavy phase, with a density of 1.02 g/cm³ and a composition of 36% of $CO_2$ and 64% of a mixture of phenol, orthocresol, toluene and water, is discharged, with pressure monitoring, at a rate of 120 kg/h. The light phase is returned direct to the intake of the strong solvent pump $PS_2$. The heavy phase is sent to flask $B_{122}$, where it is heated and flash-distilled at 50° C. and 0.2 MPa. This gives a liquid phase containing less than 0.6% by weight of $CO_2$ (a mixture of phenol, orthocresol and toluene) (77 kg/h) and a gas phase containing about 0.12% of impurity (43 kg/h). This phase is brought back to 7.8 MPa by means of a compressor.

Section 23 forms zone 5 of the process. The connections of lines 36 and 31 (FIG. 1), for introducing weak solvent and weak solvent extract respectively, are reversed. In this zone, unlike all the others, the introduction takes place in the top part and the removal in the bottom part. The weak solvent consists of gaseous $CO_2$ whose purity is 99.8% on average over one period. In a first step of the period, the gaseous stream drives the contaminated water contained in the voids between the particles into zone 4. In a second step, the gaseous $CO_2$ entrains most of the water contained in the macropores, thereby producing a mist of water in $CO_2$ in the form of weak solvent extract. An appreciable enrichment in toluene relative to the charge is also observed. In the third step of the period, the removal of extract is stopped so as to start the pressurization of the section with $CO_2$. In the second step, the weak solvent extract is sent to the separator operating at 3° C. and 0.5 MPa. The gas phase containing 99.7% of $CO_2$ must be recompressed, while the liquid phase (flow rate: about 35 kg/h) shows an enrichment in toluene relative to the charge: 0.09% by weight instead of 0.05% by weight. This stream is returned to the charge stream.

We claim:

1. A process for the continuous separation, in the fluid phase, of a mixture or charge of at least three constituents into three fractions, wherein a fluid comprising said mixture and solvent are circulated in cocurrent over a sorbent contained in at least one separation column which has, at regularly spaced intervals, feed inlets for at least part of the fluid circulating downstream of these inlets, and draw-off outlets for at least part of the fluid circulating downstream of these inlets, said column having a link or loop for external circulation of the fluid between an upstream end and a downstream end, and said draw-off outlets and the feed inlets are caused to move in cocurrent under so-called simulated countercurrent conditions, the constituents having degrees of strong, moderate and weak relative adsorption with respect to the sorbent and the solvent, the process being characterized by the following combination of steps:

a) five contiguous zones 2, 3, 4, 5 and 6 are determined which have different functions and which are connected to one another in series so that said zones and the external link ensure continuity.

b) a zone 2 is determined for adsorption of the least adsorbed constituent or constituents in the column, said zone 2 being defined by a quantity of sorbent located between an outlet for a "weak solvent" raffinate R at an upstream end of this zone and an outlet for a recycling stream at a downstream end of said zone.

c) a zone 3 is determined for adsorption of the moderately adsorbed constituent or constituents in the column, said zone being defined by a quantity of sorbent located between an inlet for said mixture at an upstream end of said zone and the outlet for the weak solvent raffinate R, said zone 3 being situated immediately upstream of zone 2.

d) a zone 4 is determined for desorption of the least adsorbed constituent or constituents immediately upstream of zone 3, said zone 4 being defined by a quantity of sorbent located between said inlet for the mixture and an outlet for a so-called weak solvent extract $E_1$, defined below, at an upstream end of said zone 4.

e) a zone 5 is determined for desorption of the moderately adsorbed constituent or constituents immediately upstream of zone 4, said zone 5 being defined by a quantity of sorbent located between said outlet for the weak solvent extract $E_1$ and an inlet for a weak solvent feed at an upstream end of said zone 5.

f) a zone 6 is determined for desorption of the most adsorbed constituent or constituents immediately upstream of zone 5, said zone 6 being defined by a quantity of sorbent located between an outlet for a so-called strong solvent extract $E_2$, defined below, at a downstream end of said zone 6 and an inlet for a strong solvent feed at an upstream end of said zone.

g) the upstream end of zone 6 is fed with so-called strong solvent $S_2$, the upstream end of zone 5 is fed with the same so-called weak solvent $S_1$ and the upstream end of zone 3 is fed with said mixture, solvent $S_2$ being at a higher temperature and/or at a higher pressure than solvent $S_1$.

h) the mixture and a stream coming from zone 4 are circulated in zone 3 under adsorption conditions which are such as to permit the adsorption of the moderately adsorbed constituent or constituents in said zone 3, and raffinate R, comprising the least adsorbed constituent or constituents and part of solvent $S_1$, is drawn off from zone 3 and separated, i) strong solvent $S_2$ and at least part of the stream coming from zone 2 are circulated in zone 6 under desorption conditions which are such as to permit the desorption of the most adsorbed constituent or constituents in zone 6, and extract $E_2$, comprising the most adsorbed constituent or constituents and the bulk of solvent $S_2$, is drawn off from zone 6 and separated, j) solvent $S_1$ and the remaining part of the stream coming from zone 6 are circulated in zone 5 under desorption conditions which are such as to permit the desorption of the moderately adsorbed constituent or constituents in zone 5, and extract $E_1$, comprising the moderately adsorbed constituent or constituents and part of solvent $S_1$, is drawn off from zone 5 and separated.

k) a stream coming from zone 5 is circulated in zone 4 under desorption conditions which are such as to permit the desorption of the least adsorbed constituent or constituents and the adsorption of the moderately adsorbed constituents.

l) the remaining part of the stream coming from zone 3 is circulated in zone 2 under adsorption conditions which are such as to permit the adsorption of the least adsorbed constituent or constituents in zone 2.

m) the inlet for the mixture, the outlet for raffinate R, the inlet for strong solvent $S_2$, the outlet for extract $E_2$, the inlet for weak solvent $S_1$, the outlet for extract $E_1$ and the outlet for the recycling stream are periodically caused to advance synchronously through the column of sorbent in the direction of circulation of the mixture and the solvent so as to displace zones 2, 3, 4, 5 and 6 in the column of sorbent and produce the following three fractions: said raffinate R, said extract $E_1$ and said extract $E_2$, each of these fractions containing at least one constituent, the constituent or constituents of each fraction being substantially totally recovered.

said process being further characterized in that the recycling stream removed at the downstream end of zone 2 is sent alternately to the upstream end of zone 6 and then to the upstream end of zone 5, and in that at least part of the stream removed at the downstream end of zone 6 is sent alternately to the upstream end of zone 5 and then to the outlet for the strong solvent $S_2$ extract $E_2$.

2. A process according to claim 1 in which strong solvent $S_2$ is introduced into zone 6 in the supercritical state.

3. A process according to claim 1 in which the adsorption conditions and the desorption conditions involve feed and draw-off rates which are such that the elution fronts move through the different zones from the upstream end to the downstream end of the column at substantially the same speed, said flow rates being defined below:

a) zone 6 is fed during a first step at a flow rate $d_3 = d_1 + d_2$, where $d_1$ is the flow rate of the recycling stream coming from zone 2 and $d_2$ is the feed rate of strong solvent $S_2$, and then during a second step with strong solvent $S_2$ at a flow rate $d_3$ which is essentially identical to the flow rate in the first step, weak solvent is recovered during the first step and is sent to a storage reservoir, and the strong solvent extract $E_2$ is recovered during a second step and is separated to give the most adsorbed constituent or constituents.

b) zone 5 is fed during a first step at a flow rate $d_5$, where $d_5 < d_3$, with at least part of the weak solvent originating from the above reservoir, and zone 5 is fed during the second step at a flow rate $d_1$ with the recycling stream coming from zone 2 and at a flow rate $d_4$, where $d_4 = d_5 - d_1$, with the remaining part of the weak solvent coming from the storage reservoir and then, if appropriate, with additional weak solvent, and at least part of the weak solvent extract $E_1$ is recovered at a flow rate $d_6$, where $d_8 < d_5$, and is separated to give the moderately adsorbed constituent or constituents.

c) zone 4 is fed with the remaining part of the flow coming from zone 5 at a flow rate equal to $d_5 - d_6$, so as to give, at the outlet, a stream coming from zone 4 at the same flow rate.

d) zone 3 is fed with said mixture at a flow rate $d_7$ and with said stream coming from zone 4 at a flow rate $d_5 - d_8$, i.e. a total flow rate $d_5 - d_6 + d_7$, and at least part of the weak solvent raffinate R is recovered at a flow rate $d_8$ and is separated to give the least adsorbed constituent or constituents, the flow rate $d_8$ being such that $d_8 + d_6 = d_4 + d_7$.

e) zone 2 is fed with the remaining part coming from zone 3 at a flow rate equal to $d_5 - d_6 + d_7 - d_8$, i.e. $d_1$, and the recycling stream is recovered at a flow rate $d_1$ in order to feed zone 6 and then zone 5, as indicated in steps a and b.

4. A process according to claim 1 in which the so-called strong solvent is used at a temperature which is at least 10° C. and advantageously 20 to 50° C. higher than that of the same so-called weak solvent.

5. A process according to claim 1 in which the so-called strong solvent $S_2$ is used at a pressure which is at least 1 MPa and advantageously 2 to 20 MPa higher than that of the same so-called weak solvent.

6. A process according to claim 1 in which the so-called strong solvent is used at a temperature and a pressure which are at least 10° C. and at least 1 MPa higher than the temperature and pressure of the same so-called weak solvent, or in which the so-called strong solvent is used at a pressure which is at least 1 MPa higher than that of the so-called weak solvent and at a temperature which is at least 10° C. lower than that of the so-called weak solvent.

7. A process according to claim 1, wherein said mixture comprises water, phenyl, orthocresol and toluene.

8. A process according to claim 1, wherein said mixture comprises xylose, aribinose and fructose or glucose.

9. A process according to claim 1, wherein said mixture comprises ethylbenzene, paraxylene, orthoxylene and metaxylene.

10. A process according to claim 1, wherein said mixture comprises flavors and essential oils.

* * * * *